United States Patent [19]
Secor

[11] Patent Number: 5,289,321
[45] Date of Patent: Feb. 22, 1994

[54] CONSOLIDATED REAR VIEW CAMERA AND DISPLAY SYSTEM FOR MOTOR VEHICLE

[76] Inventor: James O. Secor, 753 James St., Apt. 912, Syracuse, N.Y. 13203

[21] Appl. No.: 17,308

[22] Filed: Feb. 12, 1993

[51] Int. Cl.$^5$ .................... G02B 27/00; H04N 7/00
[52] U.S. Cl. ..................... 359/896; 354/81; 354/293; 358/118; 358/149
[58] Field of Search ............... 359/896; 358/103, 105, 358/108, 109, 125; 354/81, 293

[56] References Cited

U.S. PATENT DOCUMENTS

| | | | |
|---|---|---|---|
| 3,689,695 | 9/1972 | Rosenfield et al. | |
| 4,214,266 | 7/1980 | Myers | 358/108 |
| 4,277,804 | 7/1981 | Robinson | 358/108 |
| 4,288,814 | 9/1981 | Talley et al. | 358/93 |
| 4,555,725 | 11/1985 | Geiersbach et al. | 358/103 |
| 4,843,463 | 6/1989 | Michetti | 358/108 |
| 4,884,135 | 11/1989 | Schiffman | 358/103 |
| 4,910,591 | 3/1990 | Petrossian et al. | 358/103 |
| 4,937,665 | 6/1990 | Schiffman | 358/103 |
| 5,012,335 | 4/1991 | Cohodar | 358/108 |
| 5,027,200 | 6/1991 | Petrossian et al. | 358/103 |

*Primary Examiner*—Loha Ben
*Attorney, Agent, or Firm*—Wall and Roehrig

[57] ABSTRACT

A rear viewing arrangement is provided for a motor vehicle to permit the operator to view traffic conditions to rearward from left and right sides of the vehicle, as well as directly behind the vehicle. Left and right video cameras are mounted on the left and right sides of the motor vehicle forwardly of the drivers position. Each camera attachment has a miniature video camera viewing angle directed generally rearwards, and a housing or shroud that is in the form of an aerodynamic fairing disposed over the associated camera to protect the same and to minimize the amount of protuberance laterally from the side of the vehicle. The fairing also avoids unnecessary airflow turbulence, thereby streamlining the vehicle. The images viewed from these camera assemblies reproduced on an LCD viewing screen, which is integrated with the instrument cluster on the vehicle dashboard. The operator can easily observe the conditions to rearward without having to divert his or her attention from the road ahead.

13 Claims, 6 Drawing Sheets

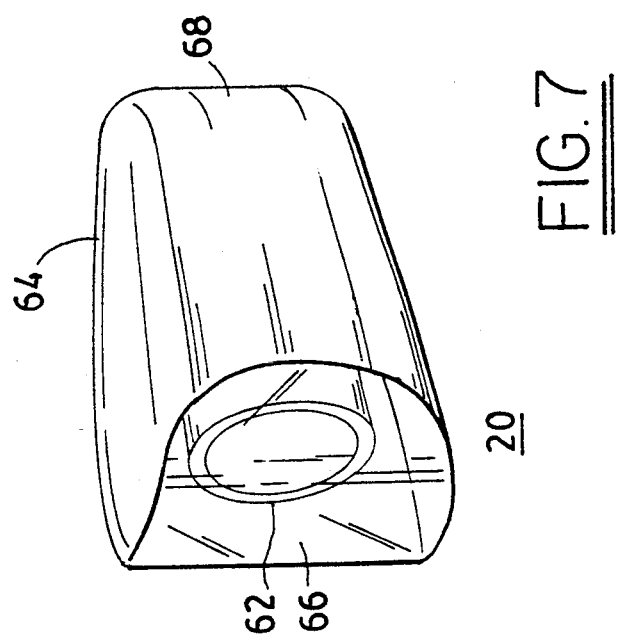

CONSOLIDATED REAR VIEW CAMERA AND DISPLAY SYSTEM FOR MOTOR VEHICLE

BACKGROUND OF THE INVENTION

This invention relates generally to devices for rearward viewing from vehicles such as passenger cars, trucks, or the like. The invention is more particularly concerned with video camera and viewing screen systems which can provide a driver or other vehicle operator a view of traffic conditions to rearwards, at least from right and left sides of the vehicle.

Conventionally, passenger vehicles and trucks are provided with outside mirrors disposed at the left (driver) side and right (passenger) side of the vehicle, and in most cases with a rear view (center) mirror providing a view through the rear windscreen. These mirrors are necessary for safe vehicle operation and give the driver a view of traffic conditions behind the vehicle. The views from the right and left outside mirrors are especially useful to detect another vehicle in an adjacent lane, if the operator is planning to make a lane change or turn.

These conventional mirrors have a number of drawbacks. For example, in order to look at the rearward traffic conditions in the right side mirror, the operator has to take his or her eyes off the road ahead and instead divert his or her attention onto the small view provided by the outside mirror. This is often done even while traffic conditions ahead are rapidly changing. However, for safe vehicle operation the need to divert one's attention from the road should be minimized. Also, the outside mirror adjustment depends on the operator position, and so if the driver adjusts the seat upwards or downwards, or back or forth, the outside mirrors also have to be readjusted.

Adjusting the mirrors in traffic can be a dangerous maneuver. Also, objects or passengers in the vehicle can often block the driver's views through the center rear view mirror and the view of the right outside mirror.

Further, because the mirrors are positioned to be in line with the driver's position, the driver's view in the outside mirrors does not always reveal another vehicle in an adjacent lane and even with the rear of the vehicle (i.e., in a so-called blind spot). This occurrence of blind spots in the rear view mirrors and outside mirrors has been an ongoing problem.

The outside mirrors also produce significant amount of wind drag, because they project a substantial distance sideways from the vehicle. These mirrors are also subject to damage if the vehicle is driven or parked where there is only a small amount of sidewards clearance.

Another problem with conventional mirrors arises during night-time operation. If another vehicle is approaching from the rear or overtaking, the mirrors reflect glare from that vehicle's headlights directly at the driver of the leading vehicle. Even if the other vehicle dims its lights, the amount of light reflected in the driver side outside mirror can produce enough glare to cause momentary night blindness. Shades or tinted glass can help to reduce glare, but these can also impair the normal rearward view.

A number of proposals have appeared in recent times for supplementing a vehicle operator's view by use of a video camera mounted somewhere on the vehicle. These have generally involved mounting video cameras in box-like housings carried on arms that project from the vehicle. Typical of these are the arrangements described in U.S. Pat. Nos. 5,027,200; 4,910,591; and 3,689,695. Video viewing arrangements for viewing from the rear of a tractor trailer are described in U.S. Pat. Nos. 4,214,266 and 4,277,804. A camera arrangement from guiding a tractor or other farm vehicle is described in U.S. Pat. No. 4,288,814. These previous proposals do not suggest any practical solution to the problems encountered with conventional outside mirrors.

OBJECTS AND SUMMARY OF THE INVENTION

It is an object of this invention to provide a video rear viewing arrangement for vehicles, which avoids the drawbacks and disadvantages of conventional systems.

It is another object to consolidate the rearward views from left, center, and right at a central or common location in the vehicle.

It is a further object to eliminate the need for an operator to look at mirrors located in three different positions, or to divert his or her attention from the road during busy or critical traffic conditions.

It is still another object to provide a rear viewing system in which sensors can be located on the vehicle body in positions where the sensors eliminate blind spots.

Another object is to eliminate the problem of glare from the headlights of a following or overtaking vehicle.

Yet another object of the invention is to improve the styling and aerodynamics of the vehicle by eliminating the conventional outside mirrors with their accompanying wind drag.

A still further object is to eliminate the need of repositioning or adjustment of outside mirrors and rear view mirrors because of a change of an operator's seating position.

According to an aspect of this invention, left and right video camera arrangements are positioned on the vehicle on the left and right sides, and even with, or more preferably ahead of the driver's position. Each video camera arrangement has a miniature video camera oriented for viewing rearwards, and enclosed in a fairing of small aerodynamic profile. A clear window is provided on the rearward side of the fairing. The camera can be of the CCD type, with a miniature prefocused lens assembly, all contained in a canister of about one centimeter diameter. The mount for the camera can include shock absorbing material within the fairing to cushion the camera against possible damage. The fairing is most favorably elongated in the longitudinal direction, so that its outer surface meets the vehicle surface (i.e. front fender) at a low angle at the fairing forward edge.

Preferably, the camera assembly is mounted at a location even with the vehicle front wheels and as high as possible on the vehicle so as to encompass a view that eliminates the "blind spot" problem of conventional mirrors.

A center viewing rear view camera can be mounted on the inside of the vehicle to view through the rear wind screen, or else in a fairing on the roof of the vehicle.

Additional cameras can be mounted, e.g. in bumpers, tail lamp lenses or turn signal lenses to view sidewards from a corner of the vehicle.

Inside the vehicle, the cameras are connected to a viewing screen or screens, where the rearward view of traffic conditions is produced. Preferably, there are left, right, and center screens, e.g. liquid crystal displays or LCDs, integrated into a dashboard display that includes other instrumentation. Alternatively, the left and right camera assemblies can be coupled to left and right displays that are mounted alongside a conventional center rear view mirror.

The above and many other objects, features, and advantages of this invention will become apparent from the ensuing description of a preferred embodiment of this invention, when read in conjunction with the accompanying Drawing.

BRIEF DESCRIPTION OF THE DRAWING

FIG. 7 illustrates a fairing arrangement for a side mounted video camera arrangement of an embodiment of this invention.

DETAILED DESCRIPTION OF THE PREFERRED EMBODIMENTS

Figure 1:
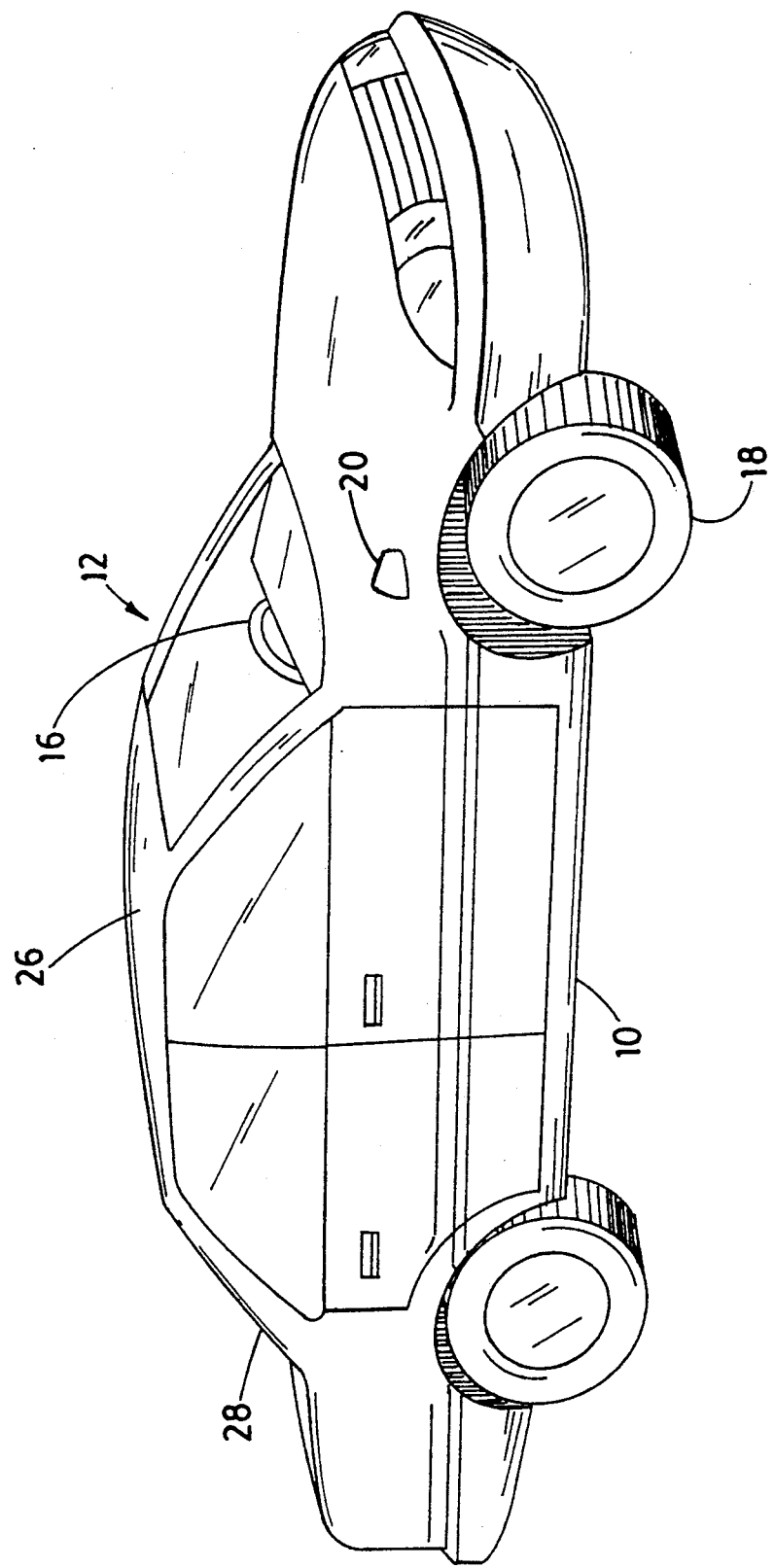
FIG. 1 is a perspective view of a passenger vehicle featuring a rear viewing video camera and a display arrangement according to one embodiment of this invention.
Figure 2:
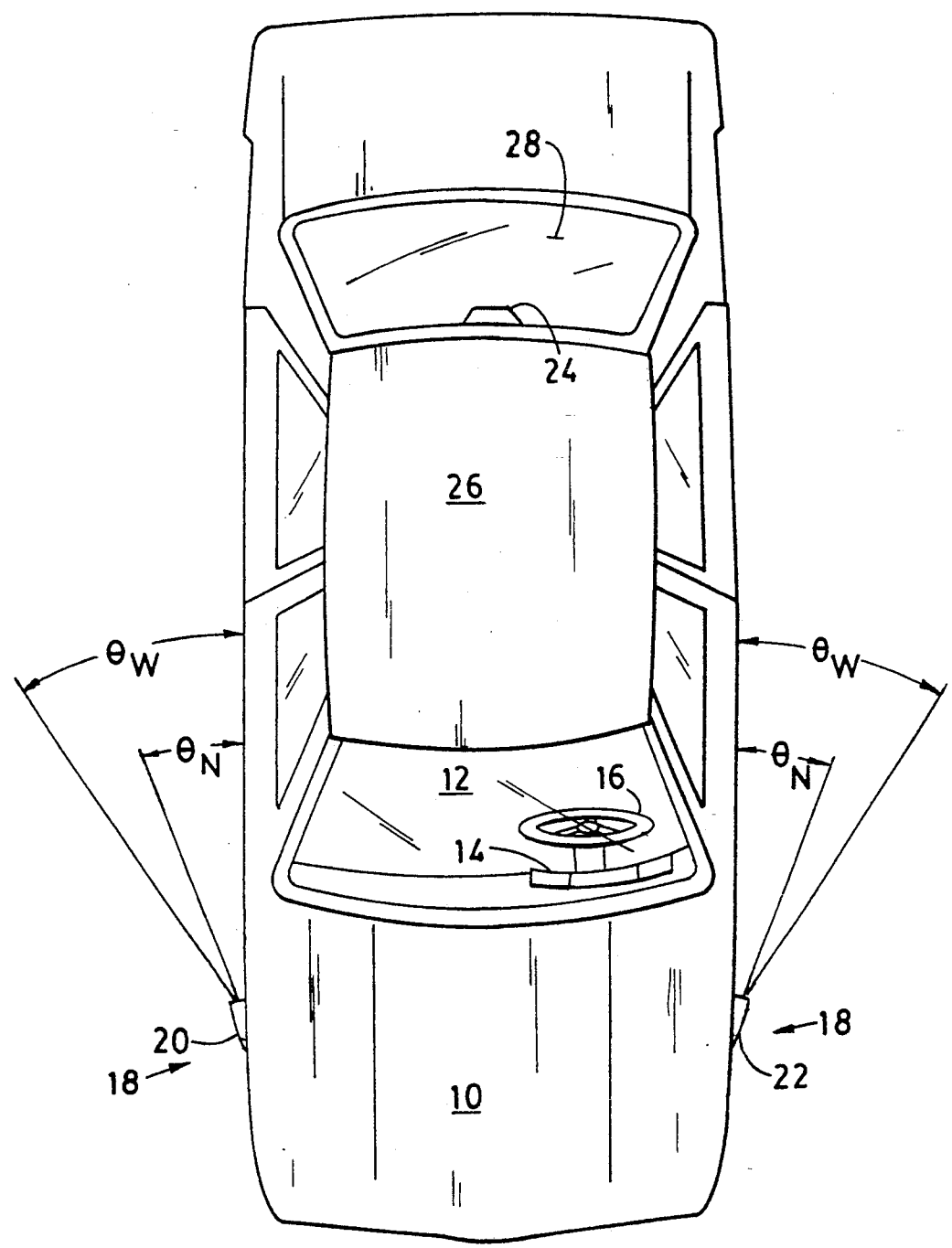
FIG. 2 is a top plan view of the vehicle.

With reference initially to FIGS. 1 and 2 of the Drawing, a typical motor vehicle 10, here a sedan, is shown with an operator position or drivers seat 12, ahead of which is an instrument panel 14 and a conventional steering wheel 16. At a position about even with front drive wheels 18 is right side or passenger side rear view camera assembly 20. At a corresponding position on the left or driver's side, is a left side rear view camera assembly 22. There is also a center rear-view camera assembly 24 mounted within the vehicle beneath the roof 26 for viewing rearwardly through a rear windscreen 28. The latter camera assembly 24 is disposed along a longitudinal center line of the vehicle 10 and produces an image of the traffic conditions directly to the rear of the vehicle, similar to that which appears in a conventional center rear view mirror. As shown in FIG. 2, the camera assemblies 20 and 22, which are mounted forward of the drivers position 12 and as high on the vehicle fenders as possible, have a normal viewing angle $\theta_n$, that encompasses an adjacent traffic lane at a position even with the rear of the vehicle 10. This provides a view of the "blind spot" area which is usually out of the coverage of a conventional side-mounted mirror on either the driver or passenger side of the vehicle. The camera assemblies 20 and 22 can also be provided, if desired, with either a wide angle lens or a zoom lens that opens to a wide angle to achieve a wider viewing angle $\theta_w$. This wider viewing angle $\theta_w$ will also reveal any vehicles in adjacent lanes.

Figure 3:
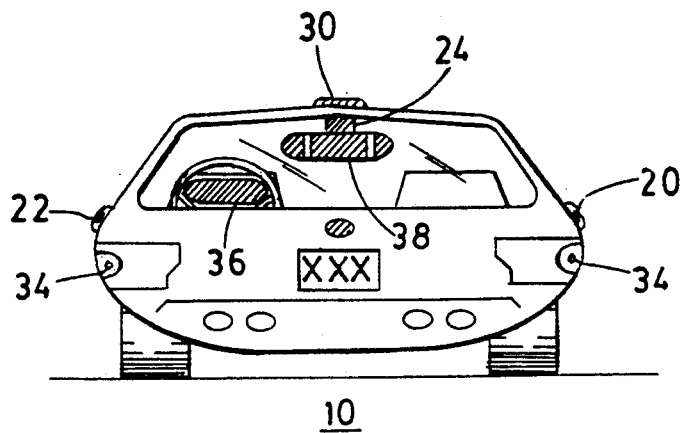
FIGS. 3 and 4 are rear and side views, respectively, of another vehicle showing alternative positions of video camera assemblies and viewing screen arrangements.
Figure 4:
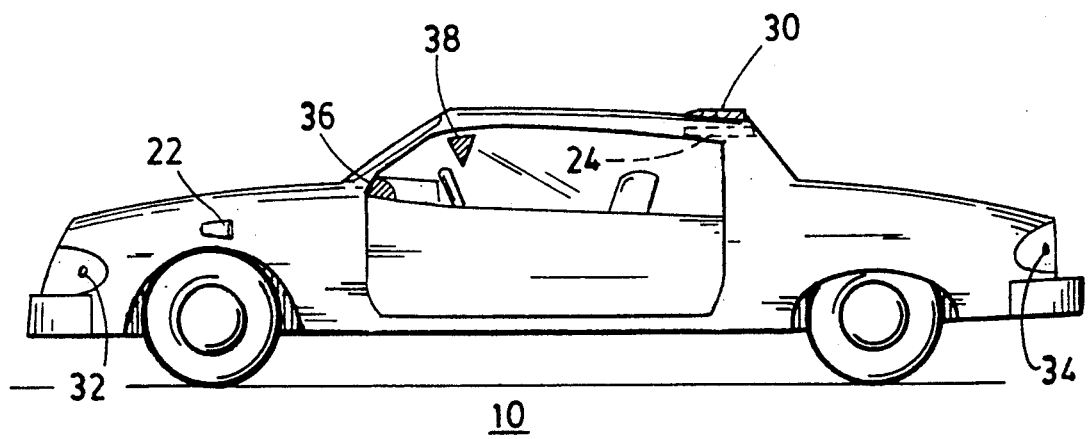

FIGS. 3 and 4, in which the vehicle 10 is simplified schematically, shows the driver-side assembly 22 and the center rear view camera assembly 24. Alternatively, the rear view camera can comprise a roof top mount 30 disposed atop of the roof 26 at its rear boundary, and on the vehicle center line. In an alternative arrangement, the rear-viewing side-mounted cameras can occupy a portion of the vehicle coach work or body work, for example in a front cornering lamp lens or front bumper of the vehicle.

In addition to the right and left side camera assemblies and the center camera assembly, it is possible to incorporate side viewing cameras 34, here disposed within a tail lamp/turn signal lens at a rear corner of the vehicle. In this case, the side viewing camera 34 is oriented sideways, that is, in the direction transversed to the traveling direction. This arrangement provides a view to the side of the vehicle, which can be enormously useful when backing out of a narrow parking spot into a busy or dangerous street, or where there are small children in the vicinity.

FIGS. 3 and 4 also show, schematically, possible positions for an in-dash rear view display assembly 36, and for an alternative hybrid rear view display 38, the latter being positioned at the usual location of a conventional center rear view mirror.

Figure 5:
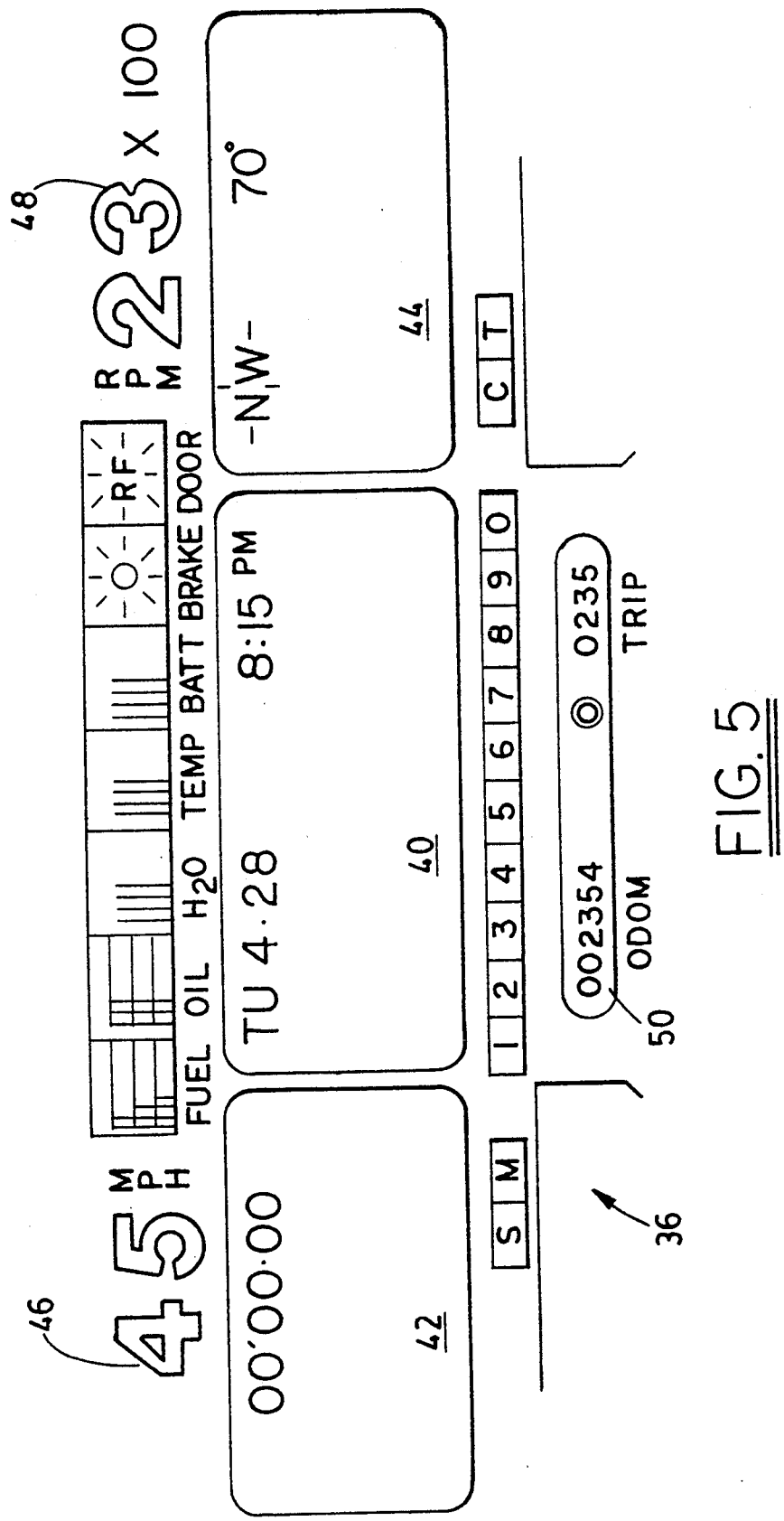
FIG. 5 illustrates an in-dashboard integrated viewing screen and instrument cluster arrangement.

As shown in more detail in FIG. 5, the in-dash display 36 can be an integrated system, in which the left, right and center views of traffic are displayed, in combination with a digital instrument cluster. In this arrangement, a center LCD screen 40 reproduces the view from the center camera assembly 24. This view can be reversed electronically from left to right, so as to simulate the traditional mirror image view as seen in a conventional rear view mirror. In this embodiment, the display 40 also carries an indication of the day and date as well as the time of day. Alongside the screen 40 is a left side LCD screen 42 which produces the view from the left side camera assembly 22. A right side LCD screen is positioned alongside the center screen 40, and reproduces the view from the right-side camera assembly 20. In this case, the screen 44 also includes indications for a digital compass and a thermometer. Also shown on this integrated dashboard display are a speedometer 46, a tachometer 48, and an odometer-trip meter 50. Various other gauges and indications are included, as is conventional.

Figure 6:
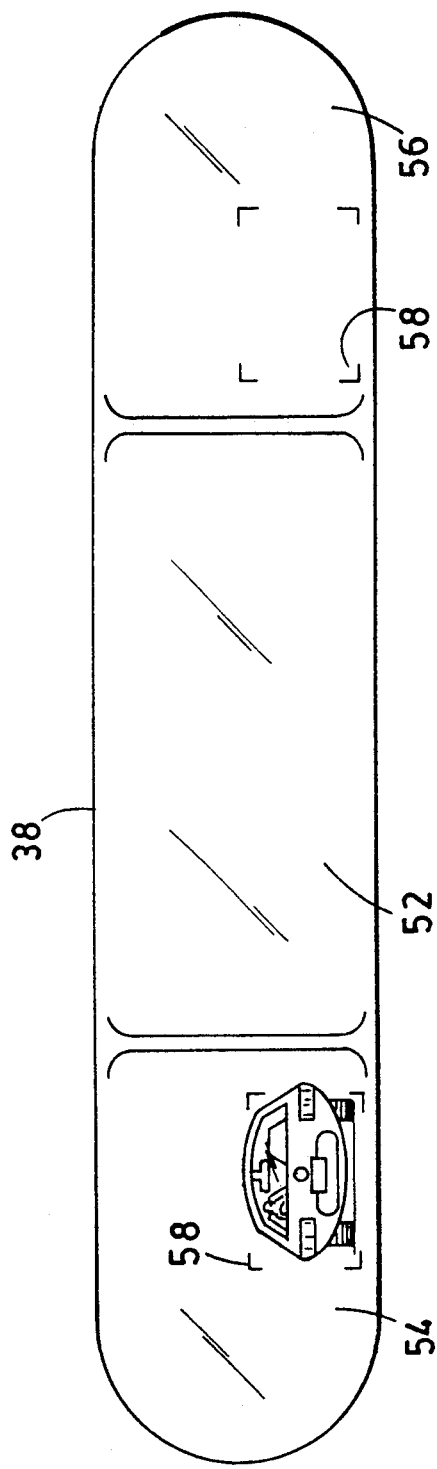
FIG. 6 shows a hybrid screen and center rear view mirror arrangement embodying this invention.
Figure 6A:
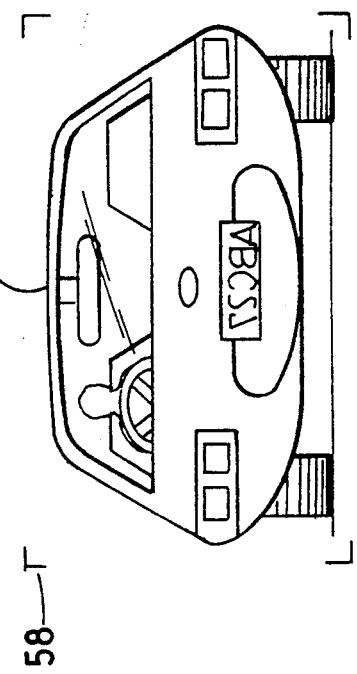
FIG. 6A is an enlargement of a portion of FIG. 6 illustrating a framing marker arrangement to assist the operator in estimating position of a following or overtaking vehicle.

The hybrid display 38 is shown in FIG. 6. Here, a conventional rear view mirror 52 is in position for the driver to view traffic to the rear through the rear windscreen 28. A left LCD screen 54, which is coupled to the left camera assembly 22, is positioned to the left of the mirror 52, and a right-side screen which is likewise connected to the camera assembly 20 is carried at the right of the mirror 52.

Each of these screens 52 and 56 carries a target marker frame 58. With this marker frame, the driver or operator can gauge or approximate the relative position of an approaching (i.e. following or overtaking) vehicle 60. That is, the vehicle 60 as it appears on the screen 54 will be approximately will fit approximately within the frame 58 when the front end of the vehicle 60 is approximately even with the rear wheels of the operator's vehicle 10. Preferably, the marker frame 58 changes in dimension automatically, if the associated camera assemblies are switched between a normal and wide screen mode or a zoom mode.

FIG. 7 shows one example of the camera assembly 20, as mounted on the right front fender of the vehicle 10. In this case, the camera assembly includes a miniature video camera 62, here shown partly in ghost. Camera 62 is based on a small CCD imager, and is contained within a canister of about one centimeter in diameter by about three centimeters in length. This camera 62 also has a small fixed-focus or variable-focus lens, and automatic exposure control. The camera lens can be normal or wide angle or can be a zoom arrangement which is movable between normal and wide positions.

Also shown in FIG. 7 is a fairing 64, or front part of the housing. This fairing 64 is elongated from front to back and is of a relatively small wind cross section. The fairing 64 is stream lined as to cause minimal disruption of the laminar flow of air passing over the car body. A window 66 or clear rearward part of the housing covers the lens side of the camera 62 and provides an unobstructed view to rearwards. The fairing 64 has an outer surface that meets the fender of the vehicle 10 at a low angle at the fairing front edge 68. This design is selected for minimal turbulence in the flow of air moving past the vehicle. This reduces air drag, thereby producing higher vehicle efficiency and somewhat better gas mileage. The smaller lateral profile of the camera assemblies 20 and 22 also provides less hazard of collision damage than with conventional outside mirrors.

In an alternative arrangement, an additional camera can be mounted at the center of the vehicle rear bumper, providing a view from the very rear of the vehicle to facilitate safe backing up. Also, a trailer-mounted camera can be employed if the vehicle is towing a boat or other trailer. The trailer-mounted camera can be connected by a cable, and its image can be reproduced on the screen 40. Also, the screens 42 and 44 can be switched between the side-rear view camera assemblies 20, 22, and the side-looking camera assemblies 34. In one preferred arrangement, switching of the screens back from the camera assemblies 34 to the side camera assemblies 20 and 22 occurs automatically, for example, if the vehicle is shifted out of reverse into a forward speed.

Instead of the integrated viewing arrangement 36 of FIG. 5, a "heads up" display (which is reflected on the windshield) could be employed. As a further alternative, an overhead display arrangement could be used.

An automatic exposure control for the video camera assemblies prevents automotive headlights from vehicles, or other bright lights, from flooding the viewing screens. In this way, the driver's night vision is not impaired, even in the event that the following driver fails to dim his or her headlights. Automatic exposure control also automatically adjusts for low light or dim viewing conditions.

While this invention has been described in detail with reference to a few selected embodiments, it should be understood that the invention is not limited to those precise embodiments. Rather, many modifications and variations would present themselves to those of skill in the art without departing from the scope and spirit of this invention, as defined in the appended claims.

What is claimed is:

1. Rear viewing arrangement for a motor vehicle to permit an operator in a driver's position within the vehicle a view of traffic conditions to rearward from left and right sides of the motor vehicle, comprising:
   left and right video camera arrangements respectively mounted on the left and right sides of the motor vehicle at a position at or forward of the said driver's position; and each said arrangement including a miniature video camera having a viewing angle directed generally rearwards, and a housing that is formed of a fairing disposed over the associated camera to protect same and minimize lateral protuberance from the side of the vehicle while avoiding unnecessary air flow turbulence, and a window on a rearward side of said fairing; and
   at least one viewing screen coupled to said video camera arrangements and disposed at said driver's position within the vehicle to reproduce left and right rearward views of the traffic conditions as viewed by said video cameras.

2. Rear viewing arrangement as recited in claim 1 wherein said fairings have a shape that is elongated in the longitudinal direction of said vehicle.

3. Rear viewing arrangement as recited in claim 2 wherein said fairings each have a forward edge forming a low angle between an outer surface of the fairing and the side of the vehicle.

4. Rear viewing arrangement as recited in claim 1, wherein said at least one viewing screen includes left and right LCD displays coupled respectively to the left and right video camera arrangements.

5. Rear viewing arrangement as recited in claim 4, wherein said left and right LCD displays are respectively positioned on left and right sides of a conventional center rear view mirror.

6. Rear viewing arrangement as recited in claim 1, further comprising a center viewing video camera arrangement mounted on said vehicle for viewing traffic conditions rearward from a centerline of said vehicle, and coupled to said at least one video display to provide at said driver's position a center rearward view of traffic conditions.

7. Rear viewing arrangement as recited in claim 6, wherein said center viewing video camera arrangement is mounted on a roof of said vehicle behind said driver's position.

8. Rear viewing arrangement as recited in claim 6, wherein said center viewing video camera arrangement is mounted within said vehicle adjacent a rear wind screen and oriented to view through the rear wind screen.

9. Rear viewing arrangement as recited in claim 6 wherein said at least one viewing screen includes left, center, and right LCD displays positioned at said driver's position and respectively coupled to said left side, center viewing and right side camera arrangements.

10. Rear viewing arrangement as recited in claim 9 wherein said left, center, and right displays are integrated into a dashboard display.

11. Rear viewing arrangement as recited in claim 1 wherein said at least one viewing screen includes a target marker frame sized to correspond to a vehicle situated at a predetermined position in the viewing range of one of said cameras.

12. Rear viewing arrangement as recited in claim 1, further comprising at least one additional camera mounted at a corner of said vehicle and oriented for sidewards viewing, and coupled to said at least one viewing screen to provide a sideward view of traffic conditions from the associated corner of the vehicle.

13. Rear viewing arrangement as recited in claim 12 wherein said additional camera is mounted within a body member of said vehicle at the respective corner thereof.

* * * * *